(12) United States Patent
Johnson et al.

(10) Patent No.: US 6,535,145 B1
(45) Date of Patent: Mar. 18, 2003

(54) IDEOGRAPHIC KEYBOARD AND METHOD

(76) Inventors: Reynold B. Johnson, 548 E. Crescent Dr., Palo Alto, CA (US) 94301; Kenneth A. Fesler, Box 7286, Stanford, CA (US) 94309; Eugene W. Weber, 334 Avila Rd., San Mateo, CA (US) 94401

( * ) Notice: Subject to any disclaimer, the term of this patent is extended or adjusted under 35 U.S.C. 154(b) by 1867 days.

(21) Appl. No.: 08/548,441

(22) Filed: Oct. 26, 1995

Related U.S. Application Data (63) Continuation-in-part of application No. 08/199,773, filed on Feb. 22, 1994, now abandoned, and a continuation-in-part of application No. 08/080,689, filed on Jun. 22, 1993, now Pat. No. 5,791,792, and a continuation of application No. 07/669,066, filed on Mar. 12, 1991, now abandoned.

(30) Foreign Application Priority Data

Feb. 22, 1995 (GB) ............................................. 9503498

(51) Int. Cl.$^7$ ............................................. H03M 11/00
(52) U.S. Cl. ............................ 341/22; 341/26; 341/28; 341/31; 235/462.01; 235/436; 400/103; 400/109; 400/110
(58) Field of Search .................. 235/462, 472, 235/462.01, 472.01, 436; 400/110, 103, 109, 139; 341/20–23, 28, 26, 31, 35; 345/168; 364/709.12

(56) References Cited

U.S. PATENT DOCUMENTS

| | | | |
|---|---|---|---|
| 3,729,618 A | 4/1973 | Drew et al. ................. 250/566 |
| 3,949,363 A * | 4/1976 | Holm .......................... 382/140 |
| 4,193,119 A * | 3/1980 | Arase et al. .................. 341/28 |
| 4,688,037 A | 8/1987 | Krieg ..................... 340/825.72 |
| 4,713,535 A | 12/1987 | Rhoades ...................... 341/21 |
| 4,722,621 A | 2/1988 | Johnson ..................... 400/110 |
| 5,260,552 A * | 11/1993 | Colbert et al. .............. 235/482 |
| 5,489,769 A * | 2/1996 | Kubo ......................... 235/462 |
| 5,525,787 A * | 6/1996 | Kubo ......................... 235/462 |
| 5,550,363 A * | 8/1996 | Obata ........................ 235/462 |

* cited by examiner

*Primary Examiner*—Benjamin C. Lee
(74) *Attorney, Agent, or Firm*—Edward S. Wright (57) ABSTRACT

Ideographic keyboard and method in which an array of characters are printed on one side of a panel and optically readable data corresponding to the characters is recorded on the other side of the panel. A character selector is moved about the first side the panel for selective alignment with the characters, and an optical reader is linked to the character selector for movement about the recorded data in concert with the character selector. The data corresponding to a selected character is read, and a coded signal for the selected character is output in response to the data which is read. In one disclosed embodiment, the data is recorded in the form of bar coding, and the reader is a bar code reader. Precise alignment of the reader with the data for the selected character is assured by reading data from a region larger than the data field itself and extracting the character data in software.

16 Claims, 6 Drawing Sheets

IDEOGRAPHIC KEYBOARD AND METHOD

This is a continuation-in-part of Ser. No. 08/199,773, filed Feb. 22, 1994, now abandoned and a continuation-in-part of Ser. No. 08/080,689, filed Jun. 22, 1993, U.S. Pat. No. 5,791,792, Aug. 11, 1998 now expired, and a continuation of Ser. No. 07/669,066, filed Mar. 12, 1991, now abandoned.

This invention pertains generally to input devices for information processing systems and, more particularly, to a keyboard and method which are particularly useful for inputting Chinese ideographs and other characters selected from sets of virtually unlimited size.

As used herein, the term "character" is used in its broadest sense and encompasses all forms of graphic representations including but not limited to letters, numbers, symbols, ideograms, icons, pictures and other images.

In the Chinese language, there are approximately 40,000 ideographs or characters, of which about 2500–3000 are in common use. A keyboard or typewriter for the Chinese language must, therefore, be capable of inputting or printing on the order of at least 2500–3000 characters.

One type of Chinese typewriter heretofore provided has separate printing elements for the most commonly used characters arranged in a matrix, with a stylus by which the element for a desired character is picked up and moved into position for printing. When uncommon characters are required, they must be individually selected from a separate tray and moved into position for use. This is a time consuming process, and a skilled operator can only print about ten characters with such a machine.

Another technique which has been employed in Chinese typewriters is to store data for the various characters in the memory of a computer and to address this information to control the operation of a printer. This technique requires a substantial amount of memory to store the data for a large set, and the characters which can be printed are limited to those for which data has been stored.

A number of different techniques have also been employed for inputting Chinese characters to computers and other data processing devices. Two of the more widely used of these techniques utilize keyboards for inputting information about the desired character in the form phonics or radicals, with software for analyzing that information which and presenting images of possible characters on the monitor screen from which the user can select the desired character. With phonics, the information input through the keyboard describes the desired character in terms of its sound, and with radicals, the information corresponds to the visual appearance of different parts of the character. Both of these techniques are relatively slow and cumbersome and, therefore, not well suited for applications such as word processing where characters need to be input at a relatively rapid rate.

U.S. Pat. 4,722,621 describes a keyboard assembly and typewriter in which a relatively large number of characters are arranged in an array on a keyboard panel, with a character selector which is moved manually about the array of characters and linked to a group of daisy wheel printing elements to effect printing of a desired character. This patent also describes the use of a magnetic medium which is transduced in accordance with the position of the character selector to provide an audible pronunciation of the selected character or to provide address signals for a read only memory in which character data is stored.

It is in general an object of the invention to provide a new and improved ideographic keyboard and method.

Another object of the invention is to provide an ideographic keyboard and method of the above character which are particularly suitable for inputting Chinese ideographs and other characters selected from sets of relatively large size.

Another object of the invention is to provide an ideographic keyboard and method of the above character which can input relatively complex characters, such as Chinese ideograms, at a faster rate than systems heretofore provided.

Another object of the invention is to provide an ideographic keyboard and method of the above character which can be implemented relatively inexpensively.

These and other objects are achieved in accordance with the invention by providing an ideographic keyboard and method in which an array of characters are printed on one side of a panel and optically readable data corresponding to the characters is recorded on the other side of the panel. A character selector is moved about the first side the panel for selective alignment with the characters, and an optical reader is linked to the character selector for movement about the recorded data in concert with the character selector. The data corresponding to a selected character is read, and a coded signal for the selected character is output in response to the data which is read. In one disclosed embodiment, the data is recorded in the form of bar coding, and the reader comprises a bar code reader. Precise alignment of the reader with the data for the selected character is assured by reading data from a region larger than the data field itself and extracting the character data in software.

As illustrated in the drawings, the typewriter includes a keyboard panel 16, a calligraphy pad 17 and a printer 18 mounted in a case or housing 19 of a size which is highly portable and readily transportable. An initial prototype of the embodiment shown in FIG. 1 has a height of about 3.5 inches, a width of about 14 inches and a length or depth of about 19 inches, and subsequent versions of the machine are expected to be even more compact than this.

Figure 1:
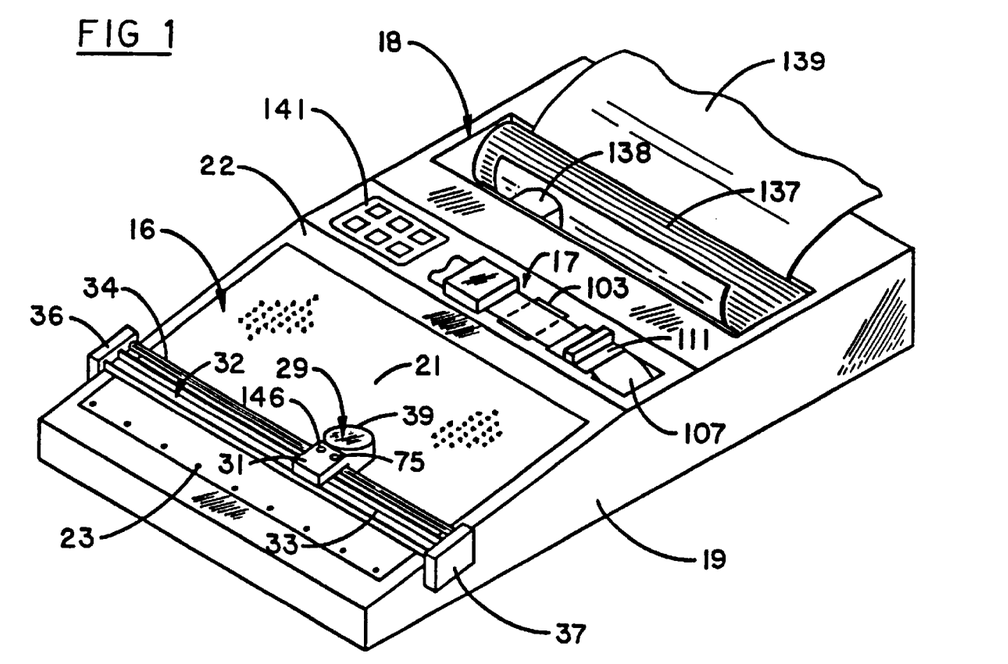
FIG. 1 is an isometric view of one embodiment of an ideographic typewriter according to the invention.
Figure 3:
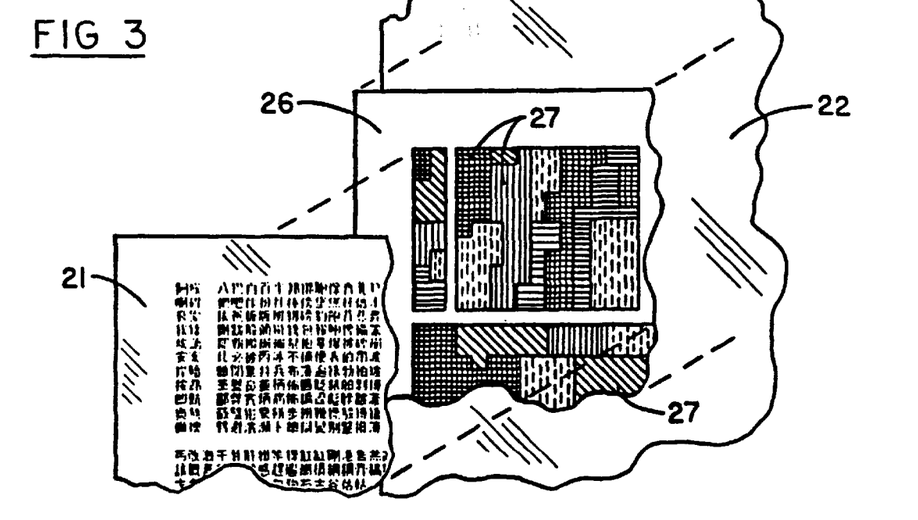
FIG. 3 is a fragmentary exploded plan view of the keyboard panel in the embodiment of FIG. 1.
Figure 4:
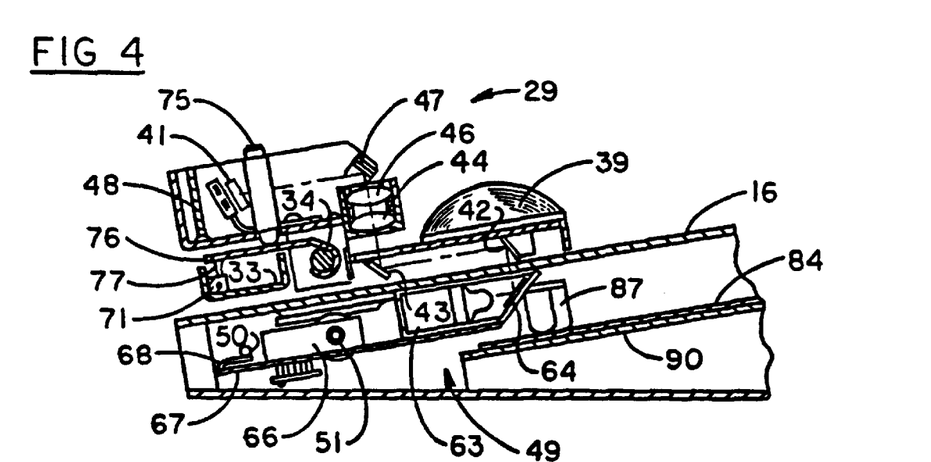
FIG. 4 is a cross sectional view taken along line 4—4 in FIG. 2.
Figure 5:
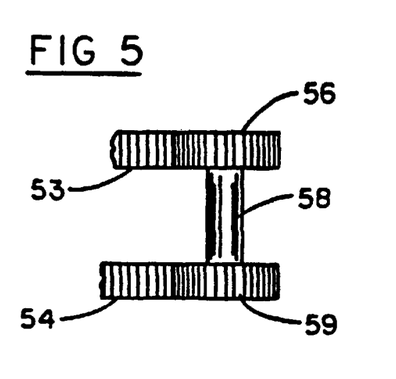
FIG. 5 is a cross sectional view taken along line 5—5 in FIG. 2.
Figure 6:
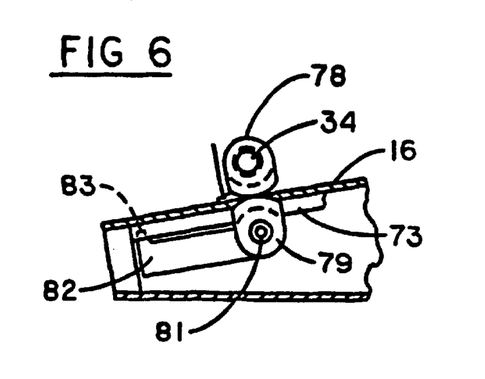
FIG. 6 is a cross sectional view taken along line 6—6 in FIG. 2.

On the keyboard panel, a set of characters is presented in an optically and visually readable form, i.e. by imprinting the characters on the panel in the same form in which they are to be printed on the output medium. The panel itself comprises a sheet or layer 21 of a transparent material such as an acrylic plastic upon which the characters are in a generally rectangular array. In one presently preferred, the characters are arranged in 80 vertically extending column and 40 horizontally extending rows on an 8.5 by 11 inch sheet, with each character being 0.125 inch square. As used herein, the terms "horizontal" and "vertical" are used with reference to the "x" and "y" directions on the keyboard panel rather than the terrestrial directions.

The character sheet is removably mounted on a sloping panel 22 on the typewriter cabinet in a manner which permits sheets containing different character sets to be readily interchanged. A plurality of registration pins 23 on panel 22 engage openings in the character sheet to hold the sheet in a predetermined position on the sloping panel. This panel is likewise fabricated of a light transmissive material such as a transparent or translucent plastic.

In the particular embodiment illustrated, the typewriter is intended for printing Chinese ideographs, and the character sheet contains approximately 3000 of the most common used ideographs or characters arranged in a manner designed to make it easy for a typist to find the desired characters. Thus, the characters are arranged in groups according to their initial consonant sounds, and within the groups, the characters are arranged by vowel sounds and the order of stroke complexity. A translucent underlay 26 is positioned beneath the character sheet and provided with areas of color 27 which are aligned with the different vowel sounds in the groups of characters. The arrangement of the characters in this manner and the color coding of the vowels gives the keyboard a "Gestalt" feel and makes it possible to locate a desired ideograph or character quickly and easily in a complex character set containing thousands of characters. The colored underlay has holes corresponding to the openings in the character sheet for engagement with the registration pins to hold the underlay in a predetermined position beneath the character sheet and thus maintain the colored areas in proper alignment with the characters.

Figure 2:
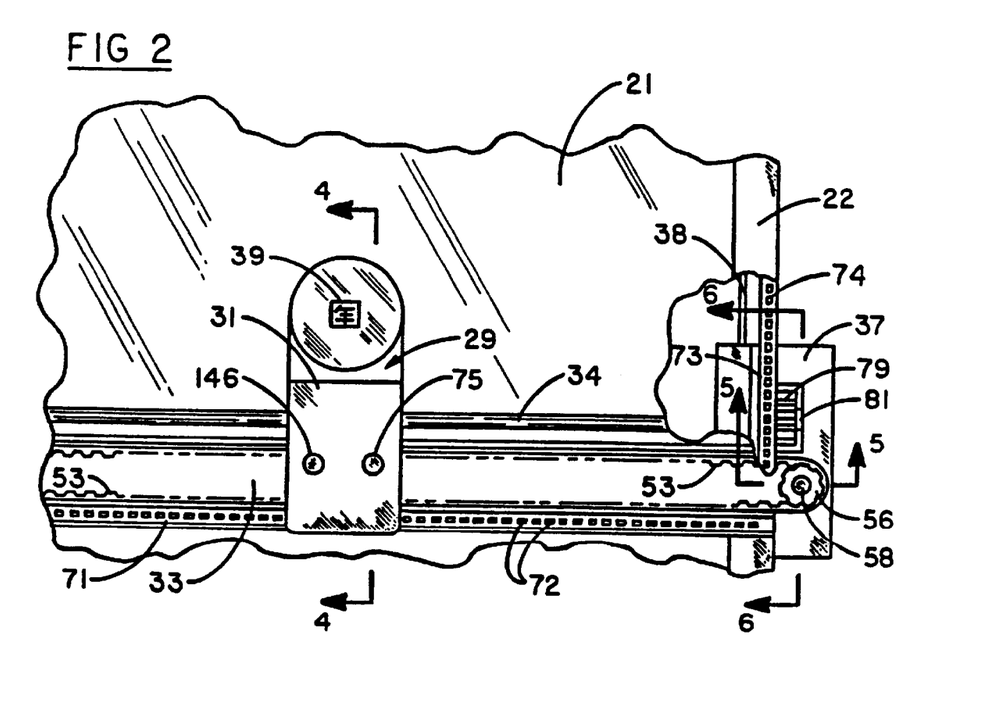
FIG. 2 is a fragmentary top plan view, partly broken away of the embodiment of FIG. 1.

A mouse assembly 29 is provided for selecting the characters to be printed by the typewriter from those imprinted upon the panel. The mouse assembly includes a mouse body 31 mounted on a carriage 32 for x–y movement relative to the keyboard panel. The carriage includes a rail 33 of u-shaped cross section and a shaft 34 on which the mouse body is mounted for movement across the keyboard panel in the horizontal or "x" direction. The end portions of the rail and shaft are supported by bearing blocks 36, 37 which are mounted on vertically extending rails 38 at the sides of the keyboard panel for movement in the vertical or "y" direction.

The mouse includes a magnifying lens 39 which is attached to the mouse body and provides an enlarged visual image of the characters beneath the lens to facilitate alignment of the mouse with a desired character.

The mouse also includes an optical scanner for reading the selected character and providing electrical signals which describe the character in bit map form. In the embodiment illustrated in FIG. 1, the scanner comprises a charge coupled device (CCD) 41 and an optical system for focusing light from the selected character on the keyboard panel to the CCD. The CCD has an array of light sensitive elements, e.g. a 40 by 60 element array, which are scanned electronically to provide the signals for the bit map.

The optical system includes a first mirror 42 positioned beneath the magnifying lens 39 for directing the light from the character toward a second mirror 43 which directs the light through a pair of focusing lenses 44, 46 to a third mirror 47 which directs the light onto the CCD. With the two dimensional CCD, the focusing lenses and the mirrors are all mounted on the mouse body in fixed positions relative to the path of light from the character to the CCD, and scanning is effected electronically. Circuitry associated with the CCD is mounted on a circuit board 48 inside the mouse.

If desired, other suitable light sensors can be utilized instead of the two dimensional CCD, in which case the scanning can be done manually. Other suitable sensors include photodiodes with optical fibers for directing light from the character to the photodiodes, or a linear or one dimensional CCD with a scanning mirror for directing light from successive portions of the character onto the light detecting elements.

The selected character is illuminated by a light source carried by a second mouse 49 located beneath the keyboard panel and constrained for movement with the upper mouse. The lower mouse is mounted on a pair of horizontally extending rods 50, 51 which extend between and are supported bearing blocks 36, 37 beneath the keyboard panel. Being affixed to the bearing blocks, these rods constrain the lower mouse for movement in the vertical direction in concert with the upper mouse. The lower mouse travels horizontally along its support rods and is connected to the upper mouse for horizontal movement in concert with the upper mouse by a pair of cogged belts 53, 54. Belt 53 is connected to the body of the upper mouse and is trained about a pair of notched pulleys or cog wheels 56 affixed to the upper ends of shafts 58 carried by bearing blocks 36, 37. Belt 54 is connected to the lower mouse and is trained about a pair of notched pulleys or cog wheels 59 affixed to the lower ends of shafts 58.

The light source carried by the lower mouse comprises a light emitting diode (LED) 63 and a mirror 64 positioned directly beneath mirror 42 for directing light from the LED through the selected character to mirror 42. In one presently preferred embodiment, support rods 50, 51 are fabricated of an electrically conductive material and are insulated electrically from each other for carrying an energizing current for the LED. In this regard, it will be noted that the lower mouse includes an insulative block 66 with a bore through which rod 50 passes and an electrically conductive contact or brush (not shown) in contact with the rod. The lower mouse also includes an elongated arm 67 of conductive material which extends beneath rod 51 and has an electrically conductive contact or brush 68 in contact with under side of that rod. Alternatively, if desired, the selected character can be illuminated by light from one or more LED's or other suitable light sources carried by the upper mouse, rather than with light from the under side of the panel.

A detent mechanism is provided for temporarily locking the upper mouse in a predetermined position relative to the keyboard panel, with the optical scanner in precise alignment with the position of the desired character on the panel. This means includes a horizontally extending detent bar 71 mounted on the carriage rail 33 and having one detent opening 72 for each column of characters on the keyboard panel. A similar bar 73 extends along the right hand side of the keyboard panel and has one detent opening 74 for each row of characters on the panel.

A manually operable detent button 75 is mounted on the mouse body for actuating the detent mechanism. This button bears upon a pivotally mounted arm 76 which has a detent pin 77 which moves into the opening in detent bar 71 with which it is aligned when the button is depressed, thereby locking the mouse in a horizontal position. Detent arm 76 is keyed to shaft 34 and causes the shaft to rotate as the button is depressed, although it is free to travel along the shaft with the mouse. A gear 78 affixed to shaft 34 meshes with a gear 79 on another shaft 81 carried by the bearing block 37, and a second detent arm 82 is affixed to this shaft. This arm carries a detent pin 83 which moves into an opening in detent bar 73 when the button is depressed, locking the mouse in a vertical position. A return spring (not shown) is included in the detent mechanism for retracting the pins from the detent openings when the button is released so the mouse will once again be free to be moved to another position. Since the lower mouse moves in concert with the upper mouse, it is likewise locked in position by the detent mechanism when the detent button is depressed.

Figure 7:
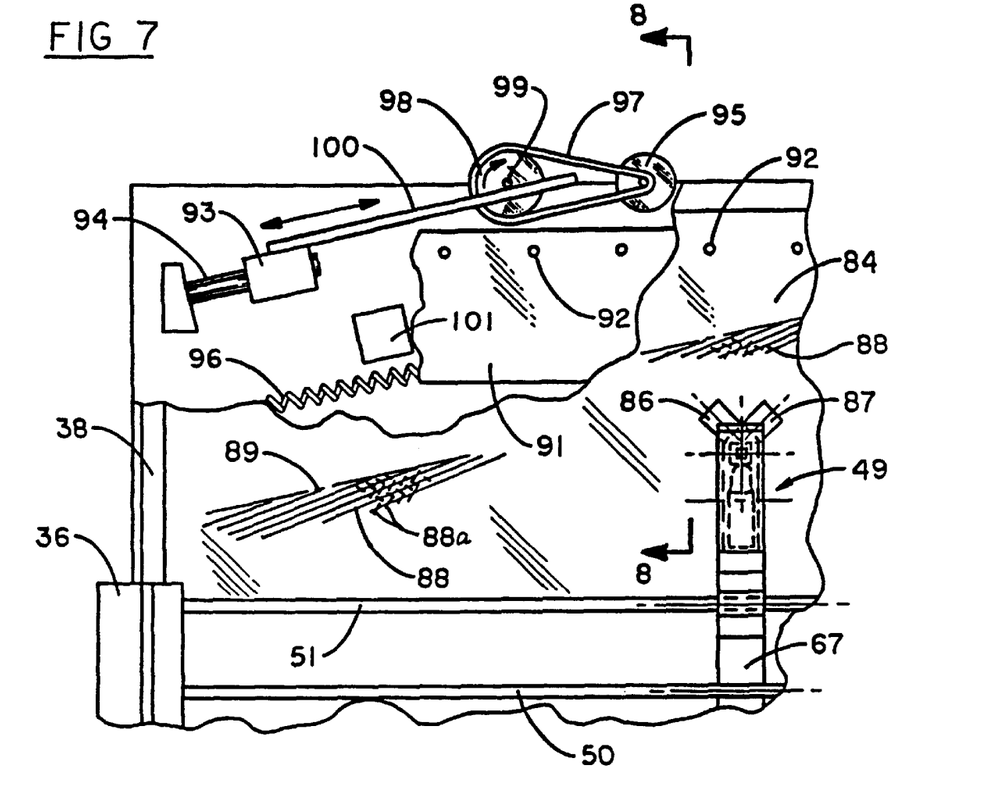
FIG. 7 is a fragmentary horizontal sectional view of the embodiment of FIG. 1.
Figure 8:
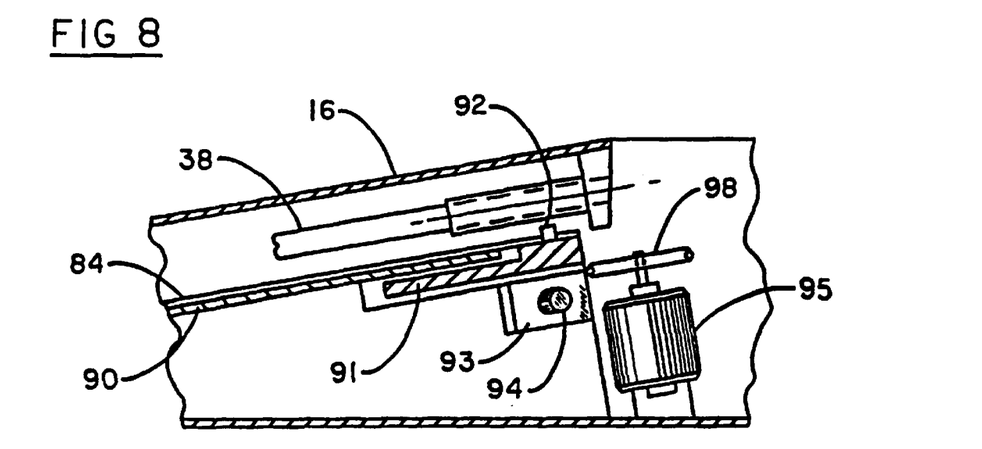
FIG. 8 is a cross sectional view taken along line 8—8 in FIG. 7.

Information associated with the characters on the keyboard panel is prerecorded on a magnetic medium 84 in the form of a generally planar sheet which is located beneath the keyboard panel in cabinet 19 and adapted to be transduced or read by a pair of transducer heads 86, 87 carried by the lower mouse. The arrangement of the medium and the heads is such that the information for a given character can be read when the character is selected by the upper mouse, and the information can be read either independently of or simultaneously with the scanning of the character on the keyboard panel. The information can be anything desired, such as a verbal pronunciation of the character, data for addressing a memory location containing a description of the character, or other data relating to the character.

As best seen in FIG. 7, the information is recorded on the magnetic medium in a plurality of tracks 88 arranged in a herringbone pattern in which the tracks extend in opposite directions at a small angle, e.g. 10 degrees, from a reference axis 89. In the embodiment illustrated, the tracks are spaced about 0.125 inch apart, and each track is about 0.75 inch long. The two heads transduce alternate tracks, and the gaps in the two heads are oriented at right angles to each other so the data in any given track has an orientation perpendicular to that of the information in the tracks adjacent to it. This has been found to be effective in preventing crosstalk between the information in adjacent tracks. In the event of physical interference which might prevent the heads from being centered directly over adjacent tracks, the two heads can be spaced any odd number of tracks apart and brought into alignment with adjacent tracks by repositioning the mouse.

The magnetic medium rests freely on the upper surface of a plate 90 which is spaced below and parallel to the keyboard panel. The rear portion of the medium is attached to a carriage 91 by registration pins 92 which engage openings in the medium. The carriage has a pair of bearing blocks 93 which are mounted on inclined shafts 94 for movement in a direction parallel to the reference axis and the centerline of the recording tracks to effect relative movement between the medium and the heads. The carriage is driven by a motor 95 and a spring 96. A drive belt 97 is trained about a small pulley on the motor shaft and a larger pulley 9B on a drive shaft 99. The drive shaft bears against the side of a drive rod 100 which is affixed to one of the bearing blocks on the carriage and extends in a direction parallel to inclined shafts 94. The motor rotates in a clockwise direction, as viewed from above, and drives the carriage and the magnetic medium toward the right as seen in FIG. 7. The spring drives the carriage toward the left at a rate controlled by a dashpot 101.

Figure 9:
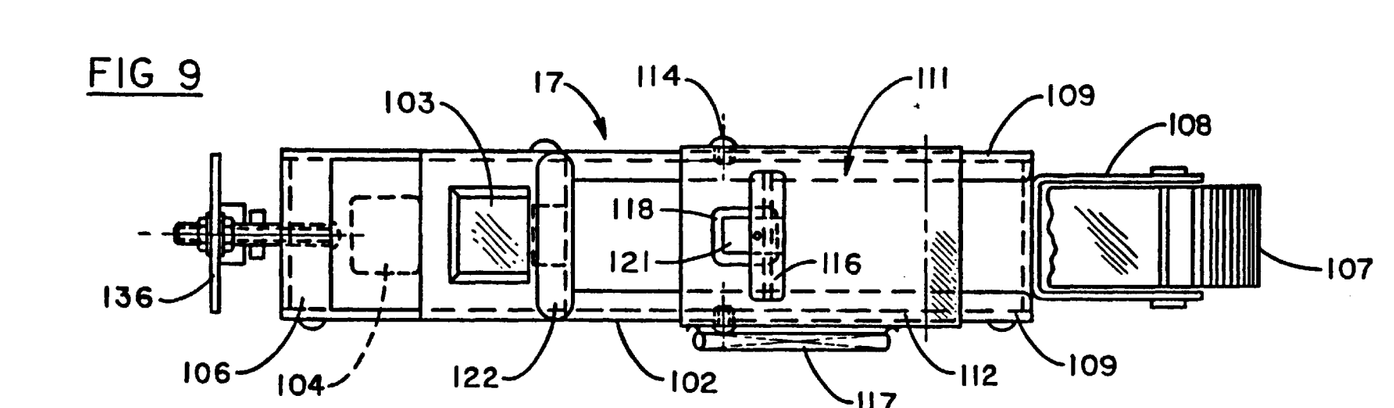
FIG. 9 is a fragmentary top plan view of the calligraphy pad in the embodiment of FIG. 1.
Figure 10:
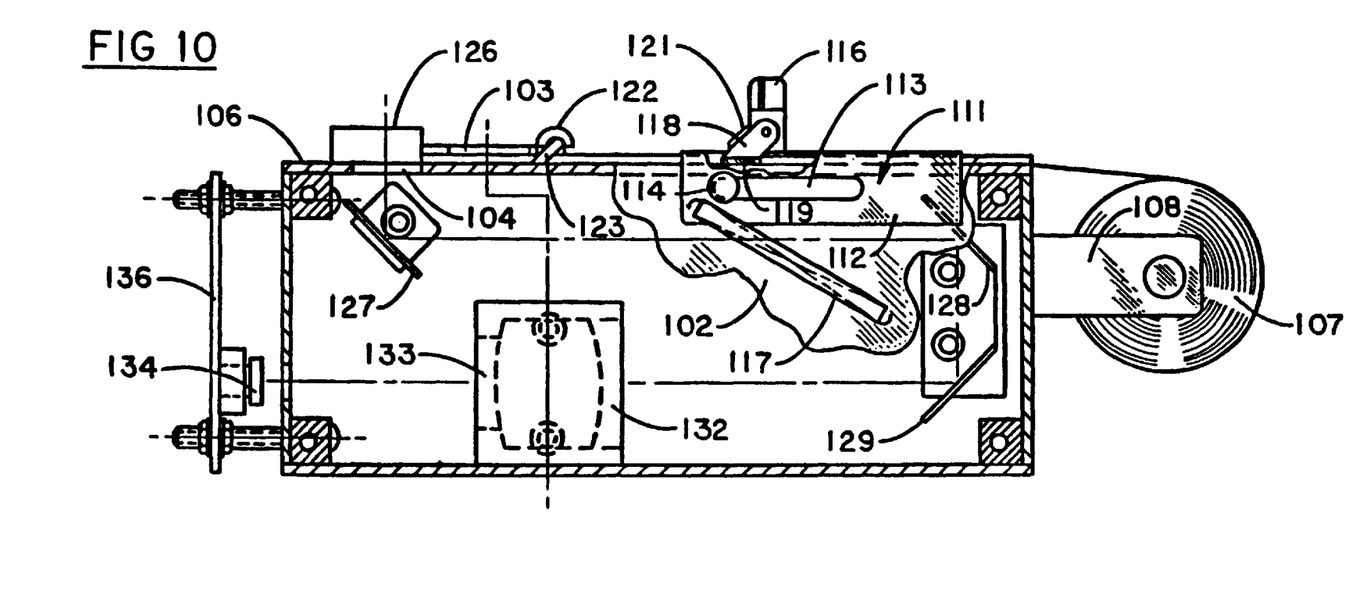
FIG. 10 is an elevational view, partly broken away, of the calligraphy pad in the embodiment of FIG. 1.

As best seen in FIGS. 9–10, calligraphy pad 17 comprises a generally rectangular light-tight housing 102, with a writing area 103 and a light transmissive window 104 on the upper wall 106 thereof. A roll of paper tape 107 is mounted on a bracket 108 outside one end of the housing, and tape from the roll is fed along the top wall of the housing past the writing area and window, with longitudinally extending edge guides 109 keeping the tape centered on the wall.

A manually operated paper feeding mechanism 111 is mounted on the housing for advancing the paper tape along the top wall toward the writing area and window in steps corresponding to the distance between the centerlines of the writing area and the window. This mechanism comprises a slider 112 having an inverted u-shaped cross section mounted on the upper portion of the housing, with guide slots 113 in the side flanges of the slider and guide pins 114 affixed to the side walls of the housing extending through the slots and constraining the slider for movement between advanced and retracted positions relative to the writing area and window. A knob 116 is affixed to the slider for moving the slider manually toward the advanced position, and a spring 117 urges the slider toward the retracted position. A shoe 118 having a rubber pad 119 on the lower side thereof is pivotally mounted on the slider and urged into engagement with the tape by a spring 121. The shoe extends downwardly and forwardly from the pivot point, and the rubber pad tends to grip the tape as the slider is advanced and to pass freely over the surface of the tape as the slider is retracted. Thus, the mechanism feeds the tape toward the writing area and window as the when the slider is advanced, but does not draw the tape back when the slider is retracted.

A snubber 122 is provided between the feeding mechanism and the writing area for holding the paper down in the writing area and preventing the paper from being withdrawn as the feeder is retracted. The snubber includes a downwardly and forwardly inclined rubber blade 123 which engages the paper to hold it down and prevent it from being withdrawn.

A light emitting diode or other suitable light source 126 is positioned above the transmissive window for illuminating characters which are written on the tape, and a mirror 127 is positioned directly beneath the window for directing light passing through the window toward a pair of mirrors 128, 129 which direct the light through a pair of focusing lenses 132, 133 to a CCD 134 similar to CCD 41. The lenses focus the light from the tape onto the CCD, and they also reduce the size of the image by a factor of four. Thus, in one presently preferred embodiment, the writing area is 0.5 inch square, and the image formed on the CCD is 0.125 inch square.

CCD 134 is scanned electronically to provide a bit map of the character written on the tape, and the CCD and the circuitry associated therewith are mounted on a circuit board 136 positioned outside the opposite end of the housing from the roll of tape. As is the case with CCD 41, other types of optical sensors can be utilized instead of a two dimensional CCD, if desired. Other suitable sensors include photodiodes in combination with optical fibers, and one dimensional arrays in combination with a scanning mirror for scanning the character to provide the data for a bit map.

Printer 18 is preferably of the type in which images are formed on the paper or other output medium as patterns of dots. Such printers include ink jet printers, laser printers, and what are commonly known as dot matrix printers. As used herein, the term "matrix printer" is used in a broad sense to designate any printer which produces an image in the form of a matrix or pattern of dots or other picture elements. The image can be formed thermally, by impact, or by any other suitable means, and in the presently preferred embodiment, the printer is a bubble jet printer.

The printer includes a platen or roller 137 and a print head 138 for forming images on a sheet of paper 139 which is trained about the platen in the conventional manner. The printer also has conventional mechanisms for rotating the platen and positioning the print head to form an image at a desired position on the paper, together with suitable circuitry for controlling the operation of these mechanisms and the operation of the print head to form the image. These elements are of conventional design, well known to those familiar with the art, and do not require further description at this point. In an initial prototype of the typewriter, the entire mechanism and circuitry from a commercially available bubble jet printer are utilized, and the control panel 141 from the printer is mounted on the upper wall of cabinet 19 for easy access by a person using the typewriter.

Figure 11:
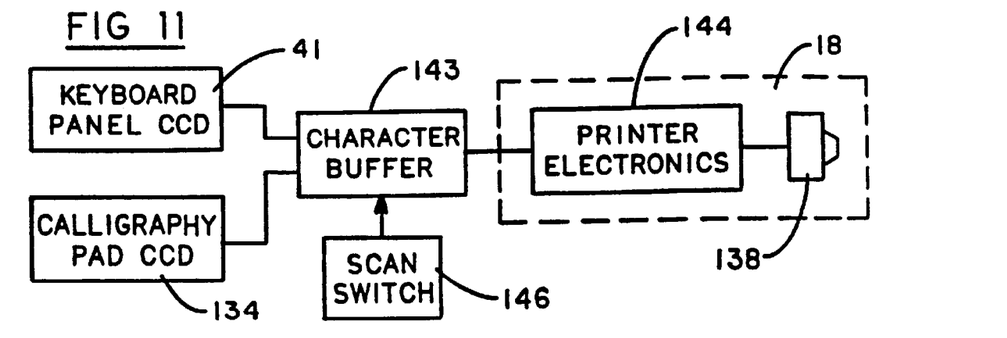
FIG. 11 is a simplified block diagram of the signal processing and printer control system in the embodiment of FIG. 1.

Referring now to FIG. 11, the bit map signals for the characters read from the keyboard panel and the calligraphy pad are stored temporarily in a character buffer 143 and applied to the control circuitry 144 for the printer. If the CCD's and the print head have similar arrays of sensing and printing elements, the bit map image from the CCD's can be printed directly by the printer. If the arrays have different numbers of elements, a microprocessor associated with the character buffer can convert the bit map to the size required by the printer. A pushbutton switch 146 is mounted on the upper mouse and connected to the control circuitry for initiating a scan of the CCD's and the printing of the selected character.

Operation and use of the typewriter, and therein the method of the invention, can be described briefly as follows. A character sheet 21 containing the desired character set is mounted on the keyboard panel, and a corresponding magnetic medium 84 is installed on carriage 91 beneath the keyboard panel. To print a character from the keyboard, the typist moves the upper mouse 29 into alignment with the desired character and depresses the detent button to lock the mouse in position. Being linked to the upper mouse, the lower mouse moves with the upper mouse and is likewise locked in position. With the character selected and the mice locked in position, the typist then depresses the button for switch 146 to initiate a scan of the character. The bit map of the character produced by the scan is stored temporarily and applied to the printer to form an image of the character on the paper in the printer.

If desired, the information recorded on the magnetic medium in association with the character can be transduced as the character is scanned, e.g. to provided a verbal pronunciation of the character as it is printed. Alternatively, the magnetically stored data can be read and utilized as desired without printing the character.

If the typist wants to print a character which is not found on the keyboard panel, he or she may do so by writing that character manually on the tape in the writing area 103 of the calligraphy pad. Once the character has been written, the tape is advanced by the typist to align the character with the window 104 where it is scanned to provide a bit map description of the character. This bit map is applied to the printer and utilized to form an image of the character on the output medium in the same manner as a bit map for a character on the keyboard panel. The character input through the calligraphy pad can be anything the typist may care to write or draw. This character is reduced in size by a factor of four by the lenses in the optical system of the calligraphy pad and is printed the same size as the characters from the keyboard panel.

Figure 12:
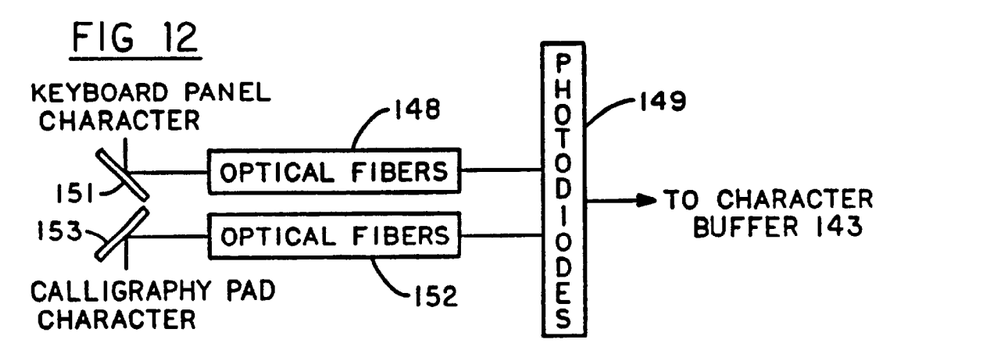
FIG. 12 is a schematic illustration of an alternate type of optical scanner for use in the embodiment of FIG. 1.

As mentioned above, other types of scanners can be used instead of the CCD's, and one example of a system employing fiber optics and photodiodes is illustrated schematically in FIG. 12. In this example, a linear array of optical fibers 148 transmits light from a character on the keyboard panel to a linear array of photodiodes 149, and the optical system between the keyboard panel and the fibers includes a scanning mirror 151 by which scanning of the character is effected. A second linear array of optical fibers 152 transmits light from a character on the calligraphy pad to the array of photodiodes, with a scanning mirror 153 in the optical system of the calligraphy pad for scanning that character. The arrays of optical fibers and photodiodes can each include any desired number of elements, e.g. 24, and the fibers for the calligraphy pad can be larger than the fibers for the keyboard since the writing area on the calligraphy pad is larger than the characters on the keyboard. Rather than having a full matrix of printing elements, the print head can likewise have a linear array.

Figure 13:
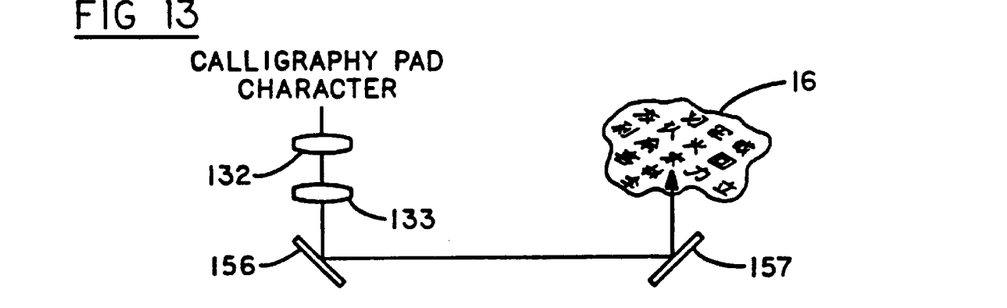
FIG. 13 is a schematic illustration of an optical system which permits the use of a single scanner for reading characters from the keyboard panel and from the calligraphy pad in the embodiment of FIG. 1.
Figure 14:
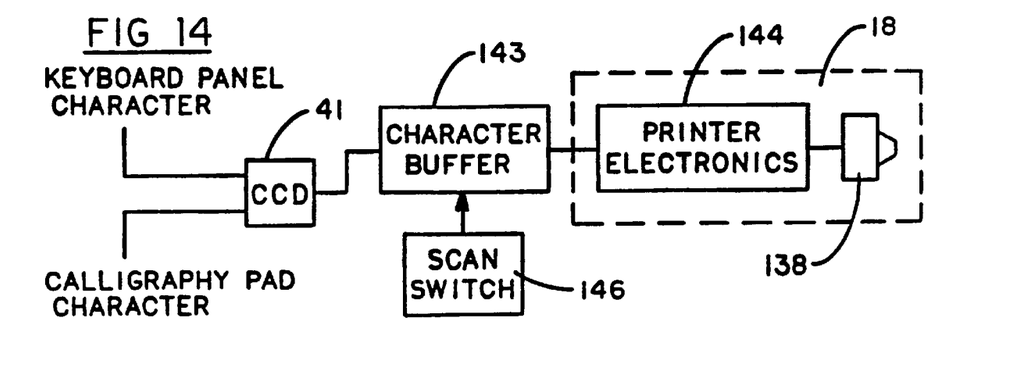
FIG. 14 is a simplified block diagram of a signal processing and printer control system for use with the optical system of FIG. 13.

As illustrated in FIGS. 13–14, it is also possible to eliminate the CCD in the calligraphy pad and utilize a single CCD or other device for reading both the characters on the calligraphy pad and the characters on the keyboard. In the embodiment of FIGS. 13–14, the character on the calligraphy pad is projected onto an unused position on the keyboard panel and scanned by the CCD 41 in the keyboard mouse. In this embodiment, a mirror 156 directs the light from lenses 132, 133 through a window in the calligraphy pad housing to a mirror 157 positioned beneath the position on the keyboard panel where the character is to be projected. Mirror 157 directs the light to the desired position on the keyboard, and lenses 132, 133 focus it on the panel.

Figure 15:
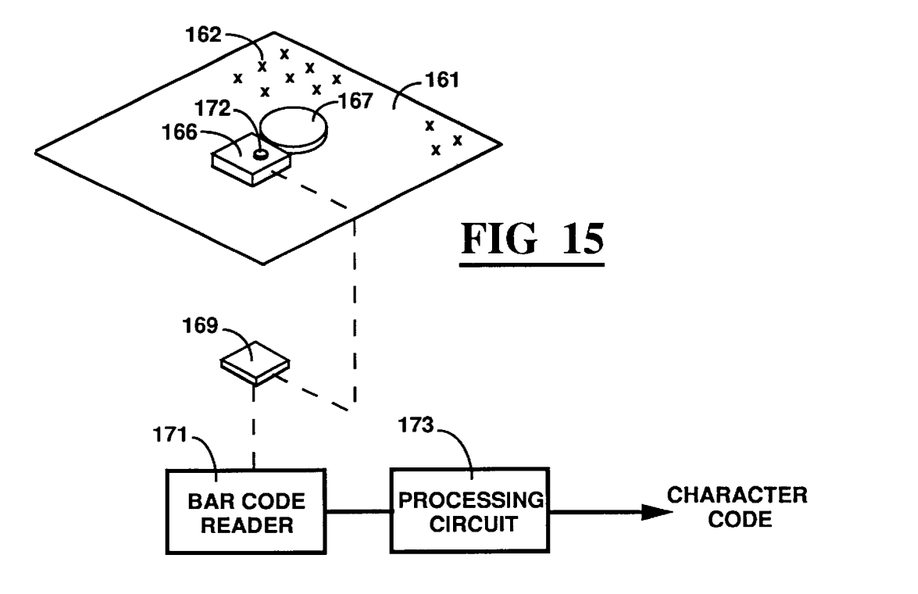
FIG. 15 is a block diagram of one embodiment of an ideographic keyboard incorporating the invention.
Figure 16:
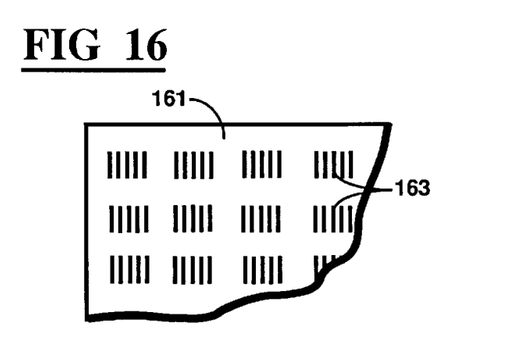
FIG. 16 is an enlarged, and somewhat schematic, fragmentary plan view of the under side of one embodiment of a character sheet for use in the embodiment of FIG. 15.

In the embodiment illustrated in FIG. 15, the keyboard has a character sheet 161 removably mounted on a sloping panel, with a set of characters 162 printed in visually readable form in a array on the upper side of the sheet in a manner similar to the array of characters on character sheet 21 in the embodiment of FIG. 1. On the back side of sheet 161, data 163 corresponding to the characters is recorded in optically readable form. This data can, for example, consist of coding utilized by computers and other data processing devices to identify the characters, e.g. ASCII coding for English characters, Big-5 coding or GB coding for Chinese characters, and JIS coding or shift-JIS coding for Japanese characters. Such coding is commonly written as a group of digits in hexadecimal form, with two digits being sufficient for ASCII codes and four digits generally being required for the larger Chinese and Japanese character sets. In the embodiment illustrated in FIG. 16, bar coding is employed for the data since it is somewhat easier to implement, and more reliable, than character recognition. The bar codes for the characters are arranged in a array corresponding to the array of characters on the front side of the sheet.

A character selection mouse 166 having a viewfinder lens 167 is provided on the upper side of the panel for visual alignment with the characters printed on the front side of sheet 161. This mouse is generally similar to mouse 29 without the scanner for reading the characters on the sheet.

A second mouse 169 is positioned on the under side of the panel and linked to the first mouse for movement in concert with it. Thus, when the upper mouse is aligned with a character on the top side of the sheet, the lower mouse is aligned with the data for that character on the under side of the sheet. The mounting and interconnection of the two mice can be as in the embodiment of FIG. 1.

Means is carried by the lower mouse for optically reading the data for a character with which the upper mouse is aligned. In the embodiment illustrated, this means comprises a bar code reader 171 of suitable known design. Such a reader can, for example, have a focused LED, means for scanning light from the LED across the bar coding, and a photodiode for detecting light reflected from the bar coding. Another suitable type of reader has a linear array of CCD's for scanning the bar coding. Reading of the bar coding is triggered by means of a manually actuated pushbutton switch 172 carried by the upper mouse and connected to the reader.

An output circuit 173 provides electrical signals which are encoded in accordance with the data read from the back side of the character sheet. These signals define the selected character in the form of a code which is recognized by existing computers and data processing devices, and can be delivered directly to such devices.

The type of reader employed is dependent upon the manner in which the data is encoded, and while a bar code reader is appropriate for bar coded data, other types of readers would be employed with other types of coding. If, for example, the data were encoded in the form of optically readable characters, an optical reader with character recognition software would be employed.

Figure 17:
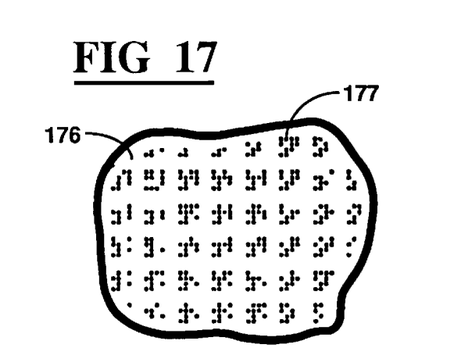
FIG. 17 is an enlarged, and somewhat schematic, fragmentary plan view of the under side of another embodiment of a character sheet for use in the embodiment of FIG. 15.

FIG. 17 illustrates a character sheet 176 on which character data on the back side of the sheet is recorded in the form of two dimensional dot patterns 177. This type of pattern can be thought of as a two dimensional bar coding and is particularly suitable for use with a reader consisting of a two dimensional array of charge coupled devices (CCD's), with one dot position in the data for each device in the array.

As in the embodiment of FIG. 1, the character sheet is readily removable from the panel, and a virtually unlimited number of characters and character sets can be provided simply by changing the character sheet. The data for each character is on the back side of the sheet, and nothing needs to be changed other than the sheet itself.

In operation and use, a sheet containing the desired character set and data is placed on the panel. The upper mouse is moved about the array of characters into visual alignment with a selected one of the characters, and the switch is pressed to actuate the reader to read the data for the selected character from the back side of the sheet. That data is converted to an encoded electrical signal (e.g., ASCII, Big-5, GB or JIS) which is output to a computer or other data processing system.

Figure 18:
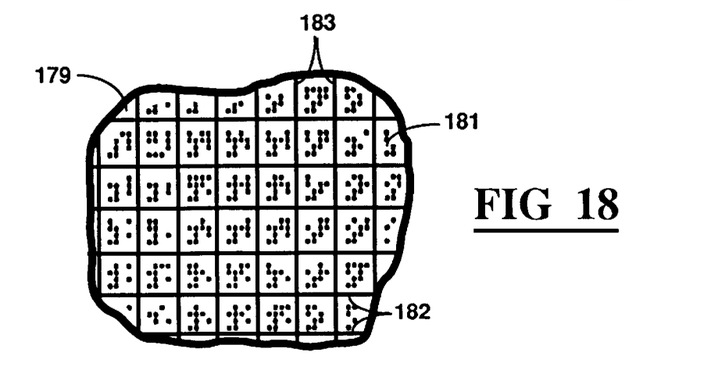
FIG. 18 is an enlarged, and somewhat schematic, fragmentary plan view of the under side of another embodiment of a character sheet for use in the embodiment of FIG. 15.

Rather than relying upon a mechanical indexing mechanism for aligning the lower mouse with the character data on the under side of the character sheet, the alignment can also be done in software, and FIG. 18 illustrates the back side of a character sheet 179 which is suitable in for use that regard. Like the character sheets employed in the other embodiments, sheet 179 has a set of characters (not shown) printed in optically readable form in an array on the front side thereof. On the back side of the sheet, data 181 for the characters is printed on a grid of horizontally extending lines 182 and vertically extending lines 183, with the data for each of the characters being printed in a box defined by four of the grid lines. In the embodiment illustrated, the data is illustrated as being in the form of dot patterns similar those of FIG. 17. However, the data can be in the form of bar coding or any other suitable form. The data for the different characters is printed at a uniform position within the boxes, e.g. centered, and is of uniform size, e.g. a 4×4 dot pattern.

The data is read with a reader of sufficient size for scanning an area corresponding to four boxes in the array, so that wherever the reader is positioned, one complete box will be within its field of view. With the data arranged in 4×4 dot patterns and each of the grid lines being one dot wide, with one blank row of dots around the data field in each box, a 14×14 element array of sensing elements (e.g., CCD's) will provide the desired field of view.

Once the upper mouse has been brought into visual alignment with a desired character, the field of view of the lower mouse contains both the data for the character and a region around the data which contains the boundary lines or reference marks for the data. The resulting image is searched in software until the reference marks are found. Then using the position information for the reference marks, the data for the character can be precisely located and extracted.

In one presently preferred embodiment, the reference lines are identified by summing the pixel values on a line by line basis in both the horizontal and vertical directions. Where the lines occur, all of the pixels are black, and with positive logic (i.e., black dots having a value of 1 and white dots having a value of 0), the sum of the pixel values is 14. The summed values are compared with a threshold greater than 10, and the only places where this condition will be satisfied is where the lines occur. Another suitable technique for identifying the reference lines is to compare the summed pixel values with each other and select the maximums.

Once the reference lines have been identified and their coordinates are known, the data for the character is extracted by using the data within a 4×4 dot area at the center of the box. In this particular example, the boundaries of the area in which the data is located are determined by subtracting 2 from the coordinates of the boundary lines with the higher coordinate values and adding two to the coordinates of the lines with the lower coordinate values.

When this software alignment technique is utilized with a system having an indexing or detent mechanism, such as the one disclosed herein, it provides correction for any inaccuracies or misalignment which may occur in the mechanism and reduces the degree of precision required of it. It also makes it possible to eliminate the mechanical indexing entirely and to rely upon visual alignment alone for positioning the mouse to select the desired character. Eliminating the indexing mechanism simplifies the system and reduces its cost.

While the software alignment technique has been illustrated with data recorded in the form of two dimensional dot patterns, it is equally applicable to other data formats such as bar coding. Since bar coding is, in effect, only a one dimensional array, proper alignment is even easier, it only being necessary for the scan line to pass somewhere through the bar code lines in one direction.

The invention has a number of important features and advantages. The data for the characters to be printed is stored on the keyboard, thereby avoiding the need for memory for storing descriptions of the characters. This permits a large number of characters to be stored inexpensively in a relatively small space, and a virtually unlimited number of characters can be provided by using interchangeable panels with different sets of characters printed on them. Even complex ideographs are formed with a single keystroke, and the keyboard can deliver the codes for such characters at speeds substantially faster than devices of the prior art. The keyboard is also inexpensive to manufacture and economical to own.

It is apparent from the foregoing that a new and improved ideographic keyboard and method have been provided. While only certain presently preferred embodiments have been described in detail, as will be apparent to those familiar with the art, certain changes and modifications can be made without departing from the scope of the invention as defined by the following claims.

What is claimed is:

1. In a keyboard: a panel having a plurality of characters printed thereon, optically readable data corresponding to each of the characters on the panel, character selection means movable about the panel for selective alignment with individual ones of the characters, means linked to the character selection means for optically reading the data for a character with which the character selection means is aligned, and means responsive to the optically read data for outputting an encoded signal for the selected character.

2. The keyboard of claim 1 wherein the optically readable data is in the form of bar coding, and the means for reading the data comprises a bar code reader.

3. The keyboard of claim 1 wherein the optically readable data is in the form of a two dimensional dot pattern, and the means for reading the data comprises an array of charge coupled devices.

4. The keyboard of claim 1 wherein the data is recorded on a medium, reference marks are recorded on the medium in predetermined positional relationship to the data for individual ones of the characters, and the means for reading the data includes means for viewing a field large enough to contain both the data for the selected character and the reference marks associated with that data, means for processing information scanned from the field of view to locate the reference marks, and means utilizing the location of the reference marks and the positional relationship between the marks and the character data for extracting the character data from the information scanned from the field of view.

5. In a method of providing character codes to a computer or other data processing device, the steps of: moving a character selector about a panel into alignment with a visual representation of a character on the panel, moving an optical reading device in concert with the character selector into alignment with optically readable data corresponding to the character, actuating the reading device to optically read the data for a character with which the selector is aligned, and outputting a code for the character in response to the optically read data.

6. The method of claim 5 wherein the data for the character is recorded in the form of a bar code.

7. The method of claim 5 wherein the data for the character is recorded in the form of a pattern of dots.

8. The method of claim 5 wherein the data is recorded on a medium, reference marks are recorded on the medium in predetermined positional relationship to the data for individual ones of the characters, and the data is read by viewing a field large enough to contain both the data for the selected character and the reference marks associated with that data, processing information scanned from the field of view to locate the reference marks, and utilizing the location of the reference marks and the positional relationship between the marks and the character data to extract the character data from the information scanned from the field of view.

9. In a keyboard: a panel having an array of characters printed on a first side thereof, an array of optically readable data corresponding to the characters on a second side of the panel, a first mouse movable about the first side of the panel for selective alignment the characters, a second mouse positioned on the second side of the panel and linked to the first mouse for movement in concert with the first mouse, means carried by the second mouse for optically reading the data for a selected character with which the first mouse is aligned, and means responsive to the optically read data for outputting an encoded signal for the selected character.

10. The keyboard of claim 9 wherein the optically readable data is in the form of bar coding, and the means for reading the data comprises a bar code reader.

11. The keyboard of claim 9 wherein the optically readable data is in the form of a two dimensional dot pattern, and the means for reading the data comprises an array of charge coupled devices.

12. The keyboard of claim 9 wherein reference marks are recorded on the second side of the panel in predetermined positional relationship to the data for individual ones of the characters, the means for reading the data includes means for viewing a field large enough to contain both the data for the selected character and the reference marks associated with that data, and the means for outputting an encoded signal for the selected character includes means for processing information scanned from the field of view to locate the reference marks, and means utilizing the location of the reference marks and the positional relationship between the marks and the character data for extracting the character data from the information scanned from the field of view.

13. In a method of providing character codes to a computer or other data processing device, the steps of: moving a first mouse about an array of characters on a first side of a panel, aligning the mouse with a selected one of the characters, moving a second mouse in concert with the first mouse about an array of optically readable data on a second side of the panel, optically reading the data for the selected character with a reading device carried by the second mouse, and outputting a code for the selected character in response to the data read optically by the reading device.

14. The method of claim 13 wherein the optically readable data is recorded on the second side of the panel in the form of bar coding.

15. The method of claim 13 wherein the optically readable data is recorded on the second side of the panel in the form of a pattern of dots.

16. The method of claim 13 wherein reference marks are recorded on the second side of the panel in predetermined positional relationship to the data for individual ones of the characters, the data is read by viewing a field large enough to contain both the data for the selected character and the reference marks associated with that data, and the code for the selected is provided by processing information scanned from the field of view to locate the reference marks, and utilizing the location of the reference marks and the positional relationship between the marks and the character data for extracting the character data from the information scanned from the field of view.

* * * * *